Apr. 10, 1923.
B. V. UNGER
1,450,965
TOOL FOR TIRE RIMS
Filed Mar. 19, 1921
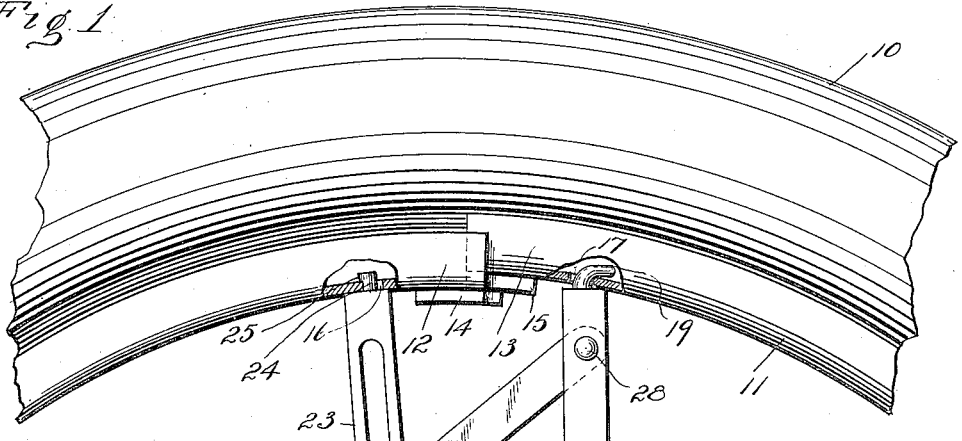
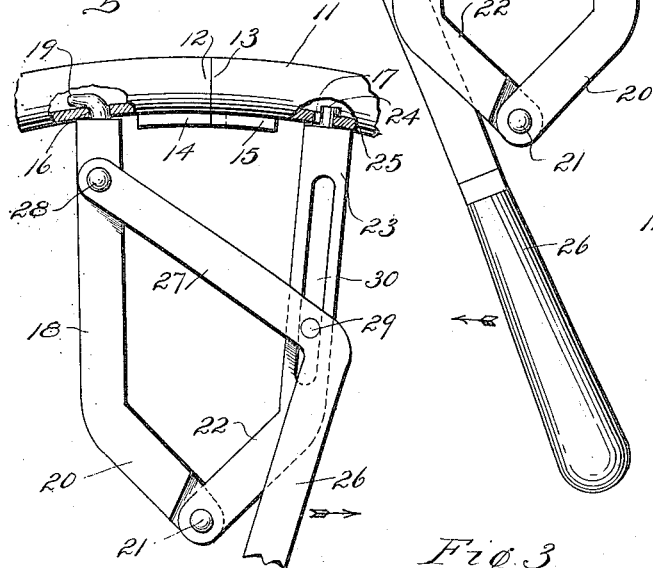
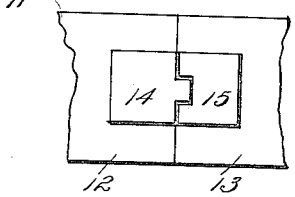
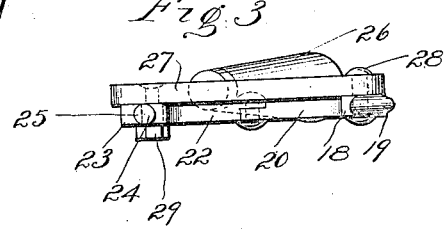
Inventor
Benjamin V. Unger
By
Atty Patented Apr. 10, 1923.

1,450,965

UNITED STATES PATENT OFFICE.

BENJAMIN V. UNGER, OF NEW HAVEN, CONNECTICUT.

TOOL FOR TIRE RIMS.

Application filed March 19, 1921. Serial No. 453,726.

*To all whom it may concern:*

Be it known that I, BENJAMIN V. UNGER, a citizen of Russia, residing at New Haven, in the county of New Haven and State of Connecticut, have invented certain new and useful Improvements in Tools for Tire Rims, of which the following is a specification, reference being had therein to the accompanying drawings.

This invention relates to tools for tire rims, referring more particularly to a tool for manipulating the end portions of a tire rim so that they may be readily joined or separated as may be desired in assembling the same with the tire or removing it therefrom.

It is the principal object of this invention to provide a tool of this character that will produce the desired results with certainty, efficiency, speed, and the minimum labor, and other objects being to provide such mechanism of the fewest possible parts, each of simple design and all capable of ready assembly.

The improvements in the details and arrangements of parts will be apparent from an inspection of the accompanying drawings in connection with the description hereinafter contained and wherein a preferred embodiment of the invention is disclosed for the purpose of imparting a full understanding thereof.

In the drawings, Figure 1 is a view of my improved tool associated with a fragmentary portion of a rim and tire;

Figure 2 is a fragmentary view thereof in another relative position wherein the tool may be associated with the rim;

Figure 3 is an end view of the tool and

Figure 4 is a fragmentary view of the abutting ends of the rim.

Having more particular reference to the drawings in connection with which like reference characters will refer to corresponding parts, 10 represents the tire of a motor vehicle, 11 the rim which is circular in form and having ends 12 and 13 which abut against each other when the rim is assembled in operative relation to the tire, and these are locked against lateral movement by the lugs 14 and 15.

All of the above parts are of a well known form and type and do not require a more specific description herein. The only modification or change made in the rim for the use of my tool is to provide the openings 16 and 17 which are both of substantially the same shape and located adjacent to the abutting ends 12 and 13 respectively of the rim.

The tool is constructed with a leg 18 having a base portion with a hook 19 at one end and provided with an angular arm 20 through which is pivotally secured by the pintle 21 the angular arm 22 of the leg 23 having a base portion with a stud 24 upon its free end formed so as to have an overhanging lip 25 at its outer end.

The numeral 26 designates the handle which has an angular arm 27 thereon, the outer end of which is pivotally secured to the base portion of the leg 18 adjacent to the hook end thereof by a pintle 28.

A stud 29 passes through the slot 30 in the leg 23 and is secured in the handle 26 at a point adjacent to the junction of said handle with the angular arm 27. By the construction herein shown the handle has a pivotal connection with the leg 18 and a sliding connection with the leg 23.

In Figure 2 the rim 11 is shown in its operative position in relation to the tire 10, the ends 12 and 13 abutting against each other and the lugs 14 and 15 being interlocked so as to prevent relative lateral movement.

To remove the rim, the tool is applied substantially as shown in Figure 2 with the hook 19 in the opening 16 and projecting over the inner side of the rim, and the stud 24 projecting through the opening 17 with the lip 25 thereon against the inner face of said rim. By now moving the handle 26 to the right as shown by the arrow in Figure 2, the free end of the leg 18 is moved away from the free end of the leg 23, and during this movement the stud 29 moves through the slot 30. This movement not only separates the abutting ends 12 and 13 of the rim 11 from each other, but also pulls that portion of the rim adjacent to the end 12 inwardly to substantially the position shown in Figure 1, at which time the rim is released from the tire and the function of the tool for this operation completed. The tire rim can now be readily removed from the tire as a result of little or no labor and the expenditure of the minimum of time.

To return the tire to its closed or operative position, the tool is applied in substantially the manner shown in Figure 1 wherein the hook 19 is inserted in the opening 17 and the stud 24 in the opening 16.

The handle is now moved to the left as shown by the arrow in Figure 1 at which time the outer ends of the legs 18 and 23 are forced apart until such time as the ends 12 and 13 of the rim just pass each other when the ends of the rim spring into position aided, if necessary, by the leg 23, at which time the ends of the rim are in the position substantially as shown in Figure 2. The tool is then removed.

By use of this tool it is a comparatively simple task, involving practically no labor, to assemble with or take off the rim of a motor vehicle tire.

Minor changes and alterations may be made within my invention, aside from those herein suggested, and I would therefore have it understood that I do not limit myself to the exact construction herein shown and described, but claim all that falls fairly within the spirit and scope of the appended claims.

What I claim as new and desire to secure by Letters Patent, is:

1. In a tire rim tool, the combination with companion legs; each of said legs having a base portion and an angular portion, these latter portions being movably secured to each other, and one of said legs having a slot therein; of a handle member movably connected with the non-slotted leg and having an operative connection with the other leg by means of said slot, whereby the said base portions will move toward and away from each other upon their common securing means, while that portion of said handle member is moving through said slot and whereby one of said legs will move through an arc, the center of which is the outer end of the other of said legs, when said handle portion has engaged either end of said slot.

2. In a device for joining and separating the ends of a tire rim having an opening therethrough adjacent to each of the abutting ends thereof, the combination with companion legs, each leg having a base portion and an inwardly inclined angular portion that are movably secured to each other with said base portions substantially parallel with each other, one of said legs having a slot in said base portion and each leg provided with a hook upon the outer end thereof, providing means, in connection with said openings, for securing said legs to said rim; and a handle member pivotally connected wtth the non-slotted leg adjacent to the hook end thereof; and a stud connected with said handle member and projecting into the said slot whereby the said base portions will move toward and away from each other, upon their commn securing means while said stud is moving through said slot, but the outer end of one of said legs will move with said handle member through an arc, the center of which is the outer end of the other of said legs when said stud engages either end of said slot.

In testimony whereof, I have hereunto affixed my signature.

BENJAMIN V. UNGER.